Patented May 24, 1932

1,859,868

UNITED STATES PATENT OFFICE

KARL GERBEL, OF WIESDORF-ON-THE-RHINE, GERMANY, ASSIGNOR TO GENERAL ANILINE WORKS, INC., OF NEW YORK, N. Y., A CORPORATION OF DELAWARE

PROCESS OF PREPARING PIGMENTS FAST TO LIGHT

No Drawing. Application filed March 8, 1929, Serial No. 345,585, and in Germany March 7, 1928.

The present invention relates to pigments fast to light and the process of preparing the same.

In U. S. Patent No. 1,731,081 there is described a process of preparing reduction products from molybdenum phosphotungstic acids of the general formula:

$$n(WO_3 + MoO_3)P_2O_5.3H_2O$$

wherein "$n$" stands for one of the numbers 18 and 24. The process of preparing the starting material, that is, the compounds $$24(WO_3 + MoO_3)P_2O_5.3H_2O$$

and $$18(WO_3 + MoO_3)P_2O_5.3H_2O,$$

is described in Journal of Biological Chemistry, 1920, volume 43. In the above cited patent there is further stated that the reduced complex molybdenum phosphotungstic acids are suitable for the manufacture of pigments.

Now I have found that the fastness to light of the pigments can be highly increased by boiling in an aqueous suspension the pigment after precipitating the dyestuff with the reduced complex compound. For the purpose of my invention there are suitable dyestuffs, containing at least one amino group, such as acid dyestuffs, containing at least one amino group and basic dyestuffs. The process is carried out by preparing a substratum for pigment dyestuffs according to usual methods as described in the literature, for example, in "Chemie in Einzeldarstellungen," edited by J. Schmidt, volume XIII: "Die Körperfarben von Hans Wagner, page 313–319; Wissenschaftliche Verlagsgesellschaft, m. b. H., Stuttgart, 1928." The substratum, obtained according to one of the known processes, may be washed, if desired, and thereafter there is added the aqueous solution of a basic dyestuff to the substratum and then the required quantity of the molybdenum phosphotungstic acid whereby the dyestuff is precipitated on the substratum to form a pigment. If an acid dyestuff containing one or more aminogroups, is used, the aqueous solution of the dyestuff is added to the substratum, then the required quantity of the complex compound is added, and finally the molybdenum phosphotungstic-acid complex compound is precipitated by the addition of a precipitating agent, such as barium chloride. Otherwise an aqueous mixture of the dyestuff and the reduced complex compound is added to the substratum and precipitated by the addition of a precipitating agent.

The quantity of the reduced molybdenum phosphotungstic complex compound varies somewhat with the specific dyestuff used, but generally one to three times the quantity, calculated on the amount of the dyestuff, will be sufficient; generally two parts by weight are added.

The pigments thus obtained are then boiled in aqueous suspension for a prolonged time, say one-half to two hours, whereby their fastness to light is highly increased.

The invention is illustrated by the following examples, without being limited thereto:—

*Example 1.*—15 parts by weight of aluminium sulfate containing 18% of $Al_2O_3$ dissolved in 150 parts of water, are mixed with 7.5 parts by weight of calcined soda dissolved in 75 parts by weight of water. To the precipitate, after previously washing the same by decanting, are added 1.5 parts by weight of methylviolet 1 B (compare Schultz, Farbstofftabellen 1923, volume 1, page 167, No. 515) in an aqueous solution and 3 parts by weight of the above identified reduced complex molybdenum phosphotungstic compound of the formula:

$$24(WO_3 + MoO_3)P_2O_5.3H_2O$$

dissolved in 30 parts by weight of water. The pigment thus obtained in an aqueous suspension is boiled for about 2 hours and filtered after cooling.

*Example 2.*—5.5 parts by weight of aluminium sulfate containing 18% of $Al_2O_3$ dissolved in 55 parts by weight of water, 3.6 parts by weight of sodium phosphate dissolved in 36 parts by weight of water, and 1.6 parts by weight of calcined soda dissolved in 16 parts by weight of water, are mixed together. The substratum thus obtained is washed three times by decanting, then there are added to the precipitate 1 part by weight Rhodamin B extra (compare, Schultz, Farbstofftabellen 1923, volume 1, page 192, No. 573) dissolved in 10 parts by weight of water and two parts by weight of the reduced complex compound of the formula:

$$18(WO_3+MoO_3)P_2O_5.3H_2O$$

dissolved in 20 parts by weight of water. The pigment thus obtained is boiled in the aqueous suspension for about 2 hours and filtered after cooling.

*Example 3.*—5 parts by weight of aluminium sulfate containing 18% of $Al_2O_3$ dissolved in 50 parts by weight of water are mixed with 2.5 parts by weight of calcined soda dissolved in 25 parts by weight of water. To the percipitation mixture there are added 1 part by weight of acid green GG extra (compare Schultz, Farbstofftabellen, volume 1, page 160, No. 505) dissolved in 10 parts by weight of water, 1.5 parts by weight of the reduced complex compound of the formula:

$$24(WO_3+MoO_3)P_2O_5.3H_2O$$

dissolved in 15 parts of water and 7 parts by weight of barium chloride. The pigment thus obtained is boiled in the aqueous suspension for about 1 hour and filtered after cooling.

I claim:

1. The process of preparing pigments fast to light which comprises boiling for about ½ to 2 hours the aqueous suspension of a pigment which has been prepared from a dyestuff containing at least one amino group, a substratum for pigment dyestuffs, and about 1 to 3 times the weight of the dyestuff of a reduction product from molybdenum phosphotungstic acids of the general formula:

$$n(WO_3+MoO_3)P_2O_5.3H_2O$$

wherein $n$ stands for one of the numbers 18 and 24.

2. The process of preparing pigments fast to light which comprises boiling for about ½ to 2 hours the aqueous suspension of a pigment which has been prepared from a dyestuff containing at least one amino group, a substratum for pigment dyestuffs, and about twice the weight of the dyestuff of a reduction product from the molybdenum phosphotungstic acid of the formula:

$$24(WO_3+MoO_3)P_2O_5.3H_2O.$$

3. The process of preparing pigments fast to light which comprises adding to a substratum, which has been prepared according to one of the well-known processes, an aqueous solution of a dyestuff containing at least one amino group, and about 1 to 3 times the weight of the dyestuff of a reduction product from molybdenum phosphotungstic acids of the general formula:

$$n(WO_3+MoO_3)P_2O_5.3H_2O$$

wherein $n$ stands for one of the numbers 18 and 24, and boiling the aqueous suspension of the pigments, thus obtained, for about ½ to 2 hours.

4. The process of preparing pigments fast to light which comprises adding to a substratum, which has been prepared according to one of the well-known processes, an aqueous solution of a dyestuff containing at least one amino group, and about 1 to 3 times the weight of the dyestuff of a reduction product from molybdenum phosphotungstic acids of the general formula:

$$n(WO_3+MoO_3)P_2O_5.3H_2O$$

wherein $n$ stands for one of the numbers 18 and 24 in an aqueous solution, and a precipitating agent, and boiling the aqueous suspension of the pigments, thus obtained, for about ½ to 2 hours.

5. The process of preparing pigments fast to light which comprises adding to a substratum, which has been prepared according to one of the well-known processes, an aqueous solution of a basic dyestuff, and about twice the weight of the dyestuff of a reduction product from the molybdenum phosphotungstic acid of the formula:

$$24(WO_3+MoO_3)P_2O_5.3H_2O$$

in an aqueous solution, and boiling the aqueous suspension of the pigment, thus obtained, for about ½ to 2 hours.

6. The process of preparing pigments fast to light which comprises adding to a substratum, which has been prepared by mixing the aqueous solutions of 15 parts by weight of aluminium sulfate containing 18% of $Al_2O_3$ and 7.5 parts by weight of calcined soda, 1.5 parts by weight of water and 3 parts by weight of a reduction product from the molybdenum phosphotungstic acid of the formula:

$$24(WO_3+MoO_3)P_2O_5.3H_2O$$

and boiling the aqueous suspension of the pigment, thus obtained, for about 2 hours.

7. As new articles of manufacture, lake pigments fast to light, prepared by the process as claimed in claim 1.

In testimony whereof I have hereunto set my hand.

KARL GERBEL. [L. S.]